United States Patent
Hill et al.

(10) Patent No.: US 11,808,311 B2
(45) Date of Patent: Nov. 7, 2023

(54) ELECTRICALLY INSULATED SHAFT COUPLING

(71) Applicant: Rolls-Royce Corporation, Indianapolis, IN (US)

(72) Inventors: Mathew Hill, Avon, IN (US); David Russell Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 217 days.

(21) Appl. No.: 17/207,068

(22) Filed: Mar. 19, 2021

(65) Prior Publication Data

US 2022/0299066 A1    Sep. 22, 2022

(51) Int. Cl.
*F16D 3/50*        (2006.01)
*F16D 1/10*        (2006.01)

(52) U.S. Cl.
CPC ............... *F16D 3/50* (2013.01); *F16D 1/10* (2013.01); *F16D 2001/103* (2013.01); *Y10S 464/90* (2013.01); *Y10T 403/472* (2015.01); *Y10T 403/475* (2015.01); *Y10T 403/7033* (2015.01)

(58) Field of Classification Search
CPC ........ F16D 3/50; F16D 1/10; F16D 2001/103; Y10S 464/90; Y10T 403/472; Y10T 403/475; Y10T 403/7033
USPC ........................................ 403/359.5; 464/900
See application file for complete search history.

(56) References Cited

U.S. PATENT DOCUMENTS

| | | | | |
|---|---|---|---|---|
| 1,435,141 A * | 11/1922 | Serrell | ...................... | F16D 3/54 |
| | | | | 464/900 |
| 1,639,240 A * | 8/1927 | Van Leir | ................... | F16D 3/68 |
| | | | | 464/900 |
| 2,592,309 A * | 4/1952 | Meier | ...................... | F16D 3/185 |
| 3,342,041 A | 9/1967 | Nebiker | | |
| 5,601,493 A * | 2/1997 | Nakazono | ............... | F16C 3/026 |
| 7,677,984 B2 * | 3/2010 | Hahn | ...................... | F16D 3/845 |
| | | | | 403/359.1 |

OTHER PUBLICATIONS

Galco Industrial Electronics, AC Motor Diagrams, retrieved from the internet Mar. 6, 2023, retrieved from <web.archive.org/www.galco.com>. (Year: 2018).*
McMaster Carr, "Electrically Isolating Servomotor Precision Flexible Shaft Couplings," retrieved from https://www.mcmaster.com/electrical-insulating-shaft-couplings/, on Mar. 10, 2021, 1 pp.
Kintronic, "Insulated Coupling," retrieved from https://www.kintronic.com/shop/insulated-coupling/, on Mar. 10, 2021, 5 pp.

(Continued)

*Primary Examiner* — Greg Binda
(74) *Attorney, Agent, or Firm* — Shumaker & Sieffert, P.A.

(57) ABSTRACT

An electrically insulated shaft coupling may include a first metallic portion, a second metallic portion, and an electrically insulating portion that separates the first metallic portion and the second metallic portion. The first metallic portion may include a first plurality of splines configured to interface with splines of a first rotating shaft, and the second metallic portion comprises a second plurality of splines configured to interface with splines of a second rotating shaft.

17 Claims, 3 Drawing Sheets

(56) References Cited

OTHER PUBLICATIONS

Hartman, "Bearing Currents," https://vfds.com/blog/bearing-currents, Mar. 20, 2014, Last Updated Oct. 30, 2020, 5 pp.
Hatfield, "What are Electric Motor Shaft Circulating Currents?," https://www.hecoinc.com/blog/what-are-electric-motor-shaft-circulating-currents, Jul. 19, 2016, 3 pp.
Helical, Selecting the Right Coupling When Electrical Isolation is a Priority, http://heli-cal.com/electrical-isolation-coupling/, Dec. 15, 2016, 6 pp.
Helwing Carbon "Understanding Circulating Currents," https://www.helwigcarbon.com/understanding-circulating-currents/, Mar. 25, 2020, 6 pp.
"Coupling (Bowex)," retrieved from https://shop.mvparts.eu/Default.aspx?search=393183, copyright 2016 (Applicant points out, in accordance with MPEP 609.04(a), that the year of publication, 2016, is sufficiently earlier than the effective U.S. filing date, so that the particular month of publication is not an issue) 2 pp.

* cited by examiner

ELECTRICALLY INSULATED SHAFT COUPLING

TECHNICAL FIELD

This disclosure relates to couplings for two rotating shafts.

BACKGROUND

Electric machines covert electrical energy to mechanical energy or vice versa. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts the rotating magnetic field to electric energy.

SUMMARY

In some examples, the disclosure describes an electrically insulated shaft coupling that includes a first metallic portion, wherein the first metallic portion comprises a first plurality of splines configured to interface with splines of a first rotating shaft; a second metallic portion, wherein the second metallic portion comprises a second plurality of splines configured to interface with splines of a second rotating shaft; and an electrically insulating portion that separates the first metallic portion and the second metallic portion.

In some examples, the disclosure describes a system that includes an electric machine comprising: a stator; a rotor; and a rotor shaft coupled to the rotor; an external shaft; and an electrically insulated shaft coupling comprising: a first metallic portion, wherein the first metallic portion comprises a first plurality of splines configured to interface with splines of a first rotating shaft; a second metallic portion, the second metallic portion comprises a second plurality of splines configured to interface with splines of a second rotating shaft; and an electrically insulating portion that separates the first metallic portion and the second metallic portion.

The details of one or more examples are set forth in the accompanying drawings and the description below. Other features, objects, and advantages will be apparent from the description and drawings, and from the claims.

DETAILED DESCRIPTION

Electric machines may be used to provide energy to, or extract energy from, rotating devices. As one example, an electric generator may convert rotational mechanical energy extracted from a combustion motor into electrical energy. As another example, an electric motor may provide rotational mechanical energy to assist with starting a combustion motor. As another example, an electric motor may provide rotational mechanical energy to drive a propulsor (e.g., fan, propeller, etc.) of a vehicle. Some electric machines may operate in various modes at different times. For instance, a particular electric machine may operate as a starter to start a combustion engine at a first time and operate as a generator to convert rotational mechanical energy generated by the combustion engine into electrical energy at a second time. In this way, some electric machines may operate as electrical starter-generators.

Figure 5:
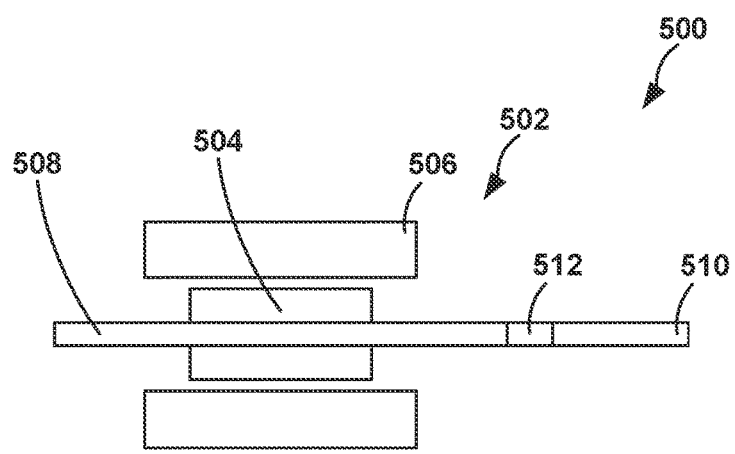
FIG. 5 is a cross-sectional conceptual diagram of an electromechanical system that includes an electric machine.

FIG. 5 is a cross-sectional conceptual diagram of an electromechanical system 500 that includes an electric machine 502. Electric machine 502 may include a rotor 504 that rotates relative to a stator 506. Rotor 504 may include magnets, e.g., permanent magnets, disposed around a cylindrical body of rotor 504. Magnetic fields of the magnets of rotor 504 interact with magnetic fields generated by windings included in stator 506 to transfer energy. Stator 506 may transfer energy to, or receive energy from, rotor 504 via interaction between magnetic fields generated by the stator windings and magnetic fields generated by rotor 504. For example, an alternating current may be applied to the stator windings, which may generate alternating magnetic fields. Interaction between magnetic fields generated by the magnets of rotor 504 and the alternating magnetic fields may transfer and convert the electrical energy in the stator windings to mechanical motion (e.g., rotation) of rotor 504. Similarly, rotation of rotor 504 in a generator may cause alternating magnetic fields which may transfer and convert the mechanical energy of the motion of rotor 504 to electrical energy in the stator windings via induction of a current in the windings by the alternating magnetic fields. However, the alternating magnetic fields in an electric machine (e.g., motor or generator) may also induce eddy currents in electrical conductors that are within the magnetic fields, such as a rotor shaft 508 of electric machine 502. Further common mode currents may flow through rotor 504.

The eddy currents and/or common mode currents in rotor 504 may be confined to rotor 504 or may flow through other electrically conductive components in or connected to electric machine 502. For instance, the eddy currents and/or common mode currents may flow through electrically conductive bearings that support shaft 508. If the magnitude and/or frequency of the eddy currents and/or common mode currents flowing through the bearings is above a certain threshold (such as above 500 mA and/or 500 Hz and/or arising from above 2 V of shaft voltage), the eddy currents and/or common mode currents may damage the bearings, leading to shorten a lifespan of the bearings. Some electric machines may include insulated bearings, which may reduce issues that eddy currents and/or common mode currents cause in the bearings. However, the eddy currents and/or common mode currents may still damage other components, such as metallic bearings in other components, if an electrically conductive path exists between the electric machine rotor shaft and the other component.

In accordance with one or more techniques of this disclosure, the rotor shaft 508 of the electric machine 502 may be coupled to another shaft 510 (e.g., a driven shaft or a driving shaft, depending on the mode of operation of the electric machine) using an electrically insulated shaft coupling 512. Electrically insulated shaft coupling 512 may include a composite construction, including metallic portions and electrically insulating portions. For instance, electrically insulated shaft coupling 512 may include two metallic portions. Each of the metallic portions may be formed from a metal and may be electrically conductive. Each metallic portion couples with a corresponding shaft 508, 510, e.g., using a splined interface. This may provide high strength and high wear resistance interfaces between electrically insulated shaft coupling 512 and the corresponding shafts 508, 510. The two metallic portions may be separated by an electrically insulating portion. The electrically insulating portion may couple the two metallic portions and electrically isolate the two metallic portions from each other.

Electrically insulated shaft coupling 512 also may include an axial connector. The axial connector may axially restrain the two metallic portions relative to each other and may help retain the electrically insulating portion between the two metallic portions. At least part of the axial connector may be formed from an electrically insulating material to prevent electrical current from conducting between the two metallic portions via the axial connector. In this way, electrically insulated shaft coupling 512 may provide a coupling with high torque capability while electrically isolating the driven or driving shaft 510 from rotor shaft 508 of electric machine 502. This may reduce or substantially eliminate risk of damage to components outside of electric machine 502 due to currents flowing out from electric machine 502 through rotor shaft 504.

Figure 1:
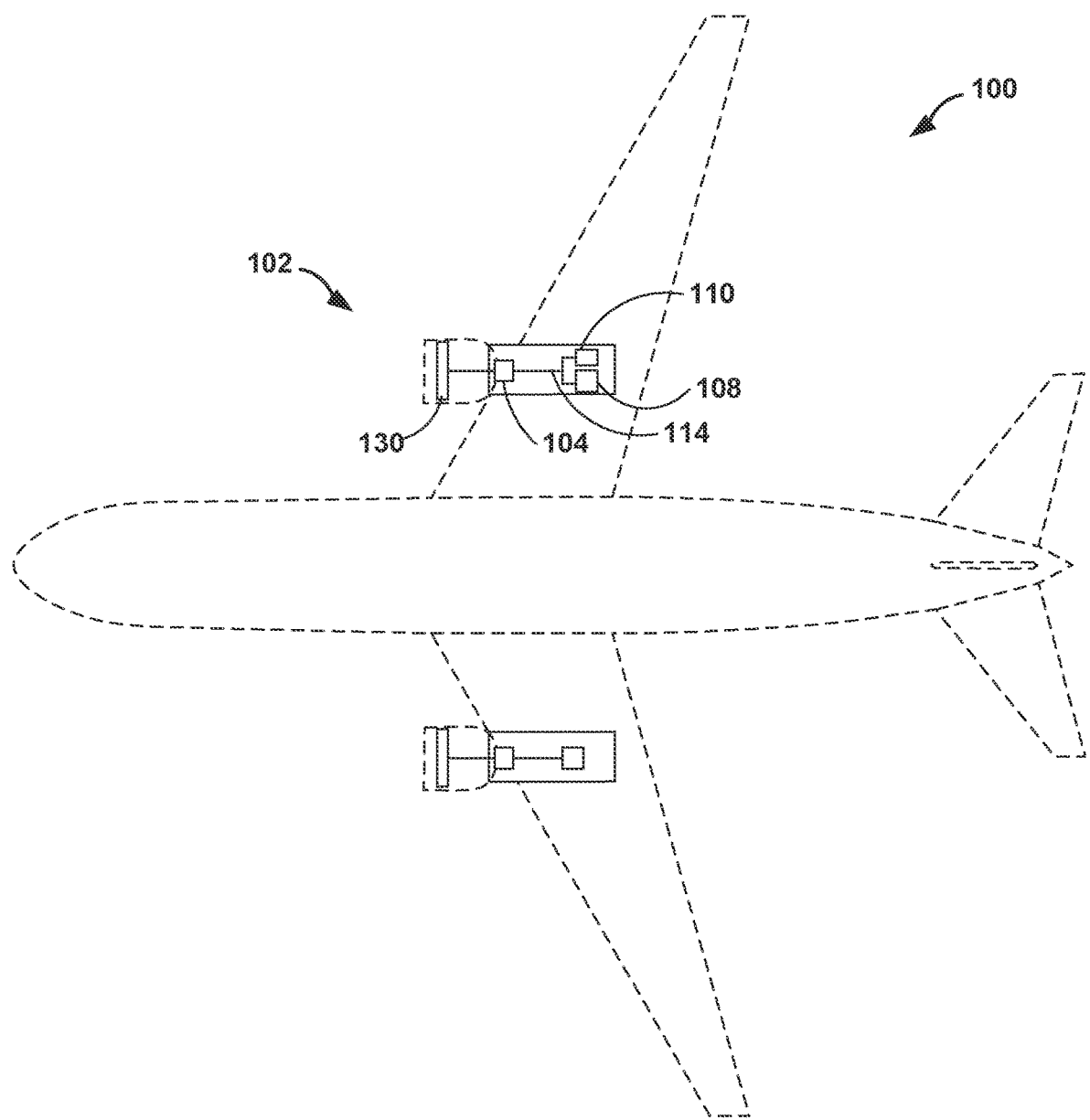
FIG. 1 is a conceptual diagram of a vehicle that includes an electric machine, in accordance with one or more techniques of this disclosure.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including an air vehicle (such as a fixed wing or rotary wing aircraft); a land vehicle (such as a tracked vehicle and/or a wheeled vehicle); a marine vehicle (such as a surface vessel, a submarine, and/or semi-submersible vehicle); an amphibious vehicle; or any combination of one or more types of air, land, or marine vehicles. Vehicle 100 may be manned, remotely operated, semiautonomous, or autonomous.

As shown in the example of FIG. 1, vehicle 100 may include propulsion system 102. In some examples, propulsion system 102 may include a combustion engine, such as a gas-turbine engine. In other examples, propulsion system 102 may be a fully electric propulsion system or a distributed propulsion system in which a gas turbine engine is located remotely from one or more propulsors driven by corresponding electric motors. Propulsion system 102 includes motor 104 that is configured to drive propulsor 130. Propulsion systems that include a gas-turbine engine may include an electric generator 108 that may both start the gas-turbine engines and generate electrical power using mechanical energy generated by the gas-turbine engines. As shown in FIG. 1, propulsion system 102 may include electric generator 108 and an energy storage system (ESS) 110 coupled to an electrical bus 114, and an electric motor 104 coupled to electrical bus 114.

In accordance with one or more techniques of this disclosure, motor 104 and/or generator 108 includes a shaft, and the shaft is coupled to another shaft using an electrically insulated shaft coupling. The electrically insulated shaft coupling may include a composite construction, including metallic portions and at least one electrically insulating portion. For instance, the electrically insulated shaft coupling may include two metallic portions. Each of the metallic portions may be formed from a metal and may be electrically conductive. Each metallic portion may couple with a corresponding shaft, e.g., using a splined interface. This may provide high strength and high wear resistance interfaces between the electrically insulated shaft coupling and the corresponding shafts. The two metallic portions may be separated by at least one electrically insulating portion. The electrically insulating portion(s) may couple the two metallic portions and electrically isolate the two metallic portions from each other.

The electrically insulated shaft coupling also may include an axial connector. The axial connector may axially restrain the two metallic portions relative to each other and may help retain the electrically insulating portion between the two metallic portions. At least part of the axial connector may be formed from an electrically insulating material to prevent electrical current from conducting between the two metallic portions via the axial connector. In this way, the electrically insulated shaft coupling may provide a coupling with high torque capability while electrically isolating the driven or driving shaft from the rotor shaft of the electric machine. This may reduce or substantially eliminate risk of damage to components outside of the electric machine due to currents flowing out from the electric machine through the rotor shaft.

Figure 2:
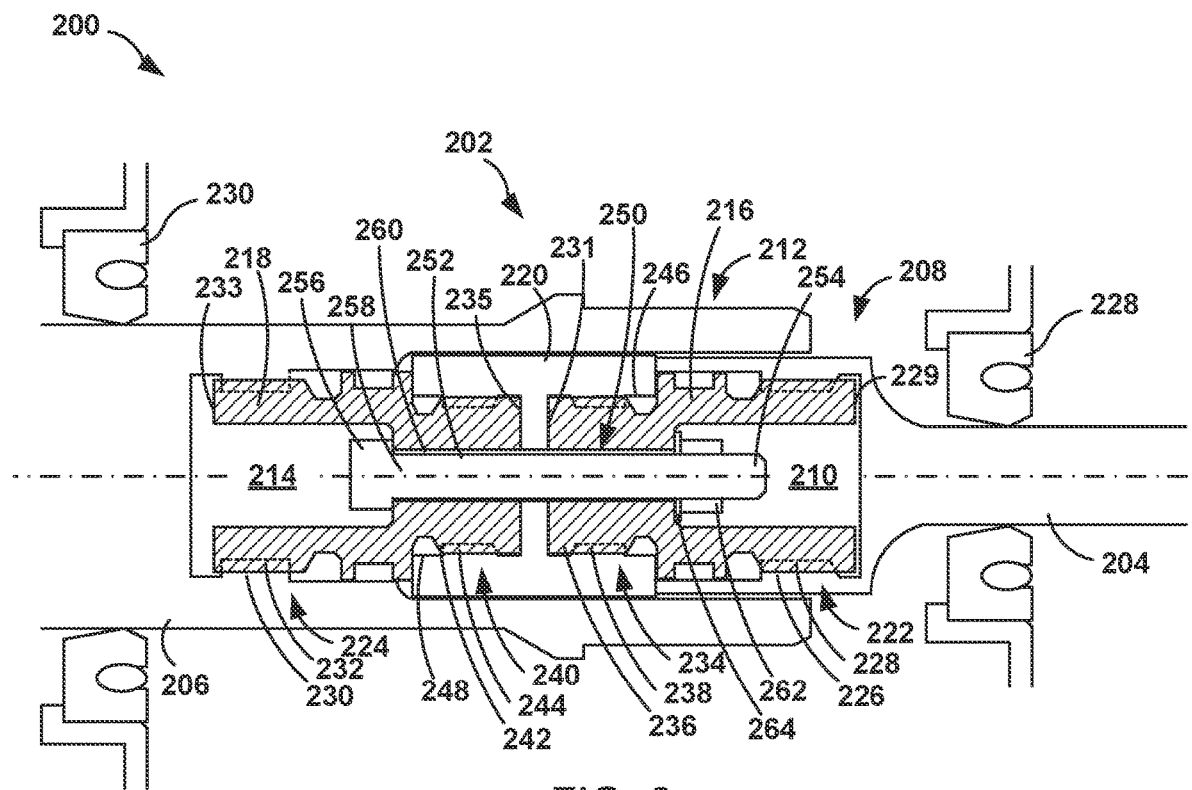
FIG. 2 is a cross-sectional diagram of an example system that includes an electrically insulated shaft coupling, in accordance with one or more techniques of this disclosure.

FIG. 2 is a cross-sectional diagram of a system 200 that includes an example electrically insulated shaft coupling 202, in accordance with one or more techniques of this disclosure. System 200 includes a first shaft 204 and a second shaft 206, which are coupled by electrically insulated shaft coupling 202. In some examples, first shaft 204 may be a rotor shaft of an electric machine and second shaft 206 may be a shaft driving first shaft 204 or being driven by first shaft 204. In other examples, second shaft 206 may be a rotor shaft of an electric machine and first shaft 204 may be a shaft driving second shaft 206 or being driven by second shaft 206. First shaft 204 may be supported by bearings 228 and second shaft 206 may be supported by bearings 230.

First shaft 204 includes an annular end portion 208 that defines a cavity 210 in which a portion of electrically insulated shaft coupling 202 is disposed. Second shaft 206 includes an annular end portion 212 that defines a cavity 214 in which a portion of annular end portion 208 and at least part of electrically insulated shaft coupling 202 are disposed.

Electrically insulated shaft coupling 202 includes a first metallic portion 216, a second metallic portion 218, and an electrically insulating portion 220. First metallic portion 216 and second metallic portion 218 may be formed of any suitable metal, such as a steel (e.g., a carbon steel or a stainless steel), a titanium alloy, an aluminum alloy, or the like. Electrically insulating portion 220 may be formed of any suitable electrically insulating material, such as an engineering plastic or a reinforced plastic. For example, electrically insulating portion 220 may be formed from a nylon, a PEEK (polyether ether ketone), a polyamide or polyamide-imide such as Torlon® (available from Solvay S.A., Brussels, Belgium), a polyimide such as Vespel® (available from DuPont, Wilmington, Del.), or the like. In examples in which electrically insulating portion 220 is formed from a reinforced plastic, the plastic may be an engineering plastic and the reinforcement material may also be an electrically insulating material', such as a glass fiber or the like.

Each of first and second metallic portions 216 and 218 are generally annular in shape and define a portion of a bore 250 extending axially through the bodies of first and second metallic portions 216 and 218. Similarly, electrically insulating portion 220 defines a portion of bore 250.

First metallic portion 216 is configured to interface with first shaft 204. Second metallic portion 218 is configured to interface with second shaft 206. For example, first metallic portion 216 and annular end portion 208 may define a first splined interface 222, and second metallic portion 218 and annular end portion 212 may define a second splined interface 224. First splined interface 222 may include a plurality of first shaft splines 226 and a plurality of first metallic portion splines 228. In the example shown in FIG. 2, the plurality of first shaft splines 226 are on a radially inner surface of annular end portion 208 and the plurality of first metallic portion splines 228 are on a radially outer surface of first metallic portion 216. The plurality of first metallic portion splines 228 are positioned near a first end 229 of first metallic portion 216.

Similarly, second splined interface 224 may include a plurality of second shaft splines 230 and a plurality of second metallic portion splines 232. In the example shown in FIG. 2, the plurality of second shaft splines 230 are on a radially inner surface of annular end portion 212 and the plurality of second metallic portion splines 232 are on a radially outer surface of second metallic portion 218. The plurality of second metallic portion splines 232 are positioned near a first end 233 of second metallic portion 218.

As shown in FIG. 2, the plurality of first shaft splines 226, the plurality of first metallic portion splines 228, the plurality of second shaft splines 230, and the plurality of second metallic portion splines 232 are linear splines that extend substantially parallel to the axis of electrically insulated shaft coupling 202. In other examples, the plurality of first shaft splines 226, the plurality of first metallic portion splines 228, the plurality of second shaft splines 230, and/or the plurality of second metallic portion splines 232 may include other types of splines, such as helical splines, curvic splines, or the like.

Splined interfaces 222 and 224 may provide for relatively high torque transfer between first shaft 204 and electrically insulated shaft coupling 202 and between electrically insulated shaft coupling 202 and second shaft 206, respectively, as the interfaces are between metallic components. Additionally, the metallic surfaces may provide relatively high wear resistance and may be lubricated using conventional lubricants and lubrication systems.

First metallic portion 216 also defines a third splined interface 234 with electrically insulating portion 220. First metallic portion 216 may include a second plurality of first metallic portion splines 236 and electrically insulating portion 220 may include a first plurality of electrically insulating portion splines 238. Together, splines 236 and 238 define third splined interface 234.

In the example shown in FIG. 2, the second plurality of first metallic portion splines 236 are positioned near a second end 231 of first metallic portion 216, opposite first end 229 of first metallic portion 216. By positioning the first plurality of first metallic portion splines 226 and the second plurality of first metallic portion splines 236 near opposite ends of first metallic portion 216, splines are not stacked, which may result in lower stress concentration regions and a smaller radial thickness of first metallic portion 216.

The first plurality of electrically insulating portion splines 238 are on an axially extending, radially inward facing surface 246 of electrically insulating portion 220. Because the splines 238 extend radially inward, they may be more robust than examples in which the splines 238 extend radially outward. This may be advantageous as the plastic from which electrically insulating portion may be relatively softer than the metal from which first metallic portion 216 is formed, and the positioning of the first plurality of electrically insulating portion splines 238 may reduce wear and/or failure of the first plurality of electrically insulating portion splines 238.

Second metallic portion 218 also defines a fourth splined interface 240 with electrically insulating portion 220. Second metallic portion 218 may include a second plurality of second metallic portion splines 242 and electrically insulating portion 220 may include a second plurality of electrically insulating portion splines 244. Together, splines 242 and 244 define fourth splined interface 240.

In the example shown in FIG. 2, the second plurality of second metallic portion splines 242 are positioned near a second end 235 of second metallic portion 218, opposite the first end 233 of second metallic portion 218. By positioning the first plurality of second metallic portion splines 232 and the second plurality of second metallic portion splines 242 near opposite ends of second metallic portion 218, splines are not stacked, which may result in lower stress concentration regions and a smaller radial thickness of second metallic portion 218.

The second plurality of electrically insulating portion splines 244 are on an axially extending, radially inward facing surface 248 of electrically insulating portion 220. Because the splines 244 extend radially inward, they may be more robust than examples in which the splines 244 extend radially outward. This may be advantageous as the plastic from which electrically insulating portion 220 may be relatively softer than the metal from which second metallic portion 218 is formed, and the positioning of the second plurality of electrically insulating portion splines 244 may reduce wear and/or failure of the second plurality of electrically insulating portion splines 244.

As shown in FIG. 2, the second plurality of first metallic portion splines 236, the first plurality of electrically insulating portion splines 238, the second plurality of second metallic portion splines 242, and the second plurality of electrically insulating portion splines 244 are linear splines that extend substantially parallel to the axis of electrically insulated shaft coupling 202. In other examples, the second plurality of first metallic portion splines 236, the first plurality of electrically insulating portion splines 238, the second plurality of second metallic portion splines 242, and the second plurality of electrically insulating portion splines 244 may include other types of splines, such as helical splines, curvic splines, or the like.

Electrically insulating portion 220 separates the second ends 231 and 235 of first metallic portion 216 and second metallic portion 218, respectively, such that there is no physical contact between first metallic portion 216 and second metallic portion 218. Further, as shown in FIG. 2, first shaft 204 does not contact second shaft 206. Thus, there is no galvanic conductive path between first shaft 204 and second shaft 206, either directly or via electrically insulated shaft coupling 202.

In some examples, electrically insulated shaft coupling 202 includes an axial connector 252 extending through bore 250. Axial connector 252 is configured to axially retain first and second metallic portions 216 and 218 relative to each other. By axially retaining first and second metallic portions 216 and 218 relative to each other, axial connector 252 also retains electrically insulating portion 220 between first and second metallic portions 216 and 218. This maintains third splined interface 234 and fourth splined interface 236 substantially stationary (i.e., maintains second plurality of second metallic portion splines 242 stationary relative to second plurality of electrically insulating portion splines 244 and maintains second plurality of first metallic portion splines 236 stationary relative to first plurality of electrically insulating portion splines 238). Reducing or substantially eliminating relative motion of these splines may help reduce wear of second plurality of first metallic portion splines 236, first plurality of electrically insulating portion splines 238, second plurality of second metallic portion splines 242, and second plurality of electrically insulating portion splines 244. Wear reduction may be particularly significant for first plurality of electrically insulating portion splines 238 and second plurality of electrically insulating portion splines 244, since these splines are formed from a material that is relatively soft compared to the material from which second plurality of first metallic portion splines 236 and second plurality of second metallic portion splines 242 are formed.

Axial connector 252 extends from a first end 254 to a second end 256. First end 254 may be positioned in cavity 210 and second end 256 may be positioned in cavity 214. First end 254 and second end 256 are joined by (and, optionally, defined by) shaft 258.

In some examples, shaft 258 may be formed from a metal. Shaft 258 may be formed from any suitable metal, such as a steel (e.g., a carbon steel or a stainless steel), a titanium alloy, an aluminum alloy, or the like.

Axial connector 252 also includes a nut 262, which screws on a threaded portion of shaft 258. First and/or second ends 254 and 256 may include threads on which nut 262 may be threaded. Nut 262 applies axial compression and retains first and second metallic portions 216 and 218 relative to each other and compresses electrically insulating portion 220 between second ends 231 and 235. In the example shown in FIG. 2, first end 254 includes threads on which nut 262 is threaded. Nut 262 may be formed from a metal, such as a similar metal from which thread 258 is formed.

In examples in which shaft 258 is formed from a metal, axial connector 252 may include one or more structures configured to separate and electrically insulate shaft from first metallic portion 216 and second metallic portion 218. For example, axial connector 252 may include a sheath 260 that surrounds a circumference of shaft 258 and extends substantially the length of bore 250.

Sheath 260 may be formed from an electrically insulating material. For example, sheath 260 may be formed from a plastic, such as an engineering plastic, or another dielectric material. For example, sheath 260 may be formed from a nylon, a PEEK (polyether ether ketone), a polyamide or polyamide-imide such as Torlon® (available from Solvay S.A., Brussels, Belgium), a polyimide such as Vespel® (available from DuPont, Wilmington, Del.), or the like. In examples in which sheath 260 is formed from a reinforced plastic, the reinforcement material may be electrically insulating, such as a glass fiber or the like.

Sheath 260 may have a wall thickness selected so that sheath 260 is electrically insulating. In some examples, the wall thickness of sheath 260 may be selected so that sheath 260 substantially prevents both galvanic conduction across sheath 260 and capacitive coupling across sheath 260. The wall thickness may be determined based on the material from which sheath 260 is formed, and the parameters of the electrical signal (e.g., voltage and frequency) to which sheath may be exposed during use.

In some examples in which shaft 258 is formed from a metal, axial connector 252 may include an electrically insulating washer 264 between nut 262 and first metallic portion 216. Optionally, axial connector 252 also may include an electrically insulating washer between the head of axial connector 252 at second end 256. Electrically insulating washer 264 may be formed from an electrically insulating material. For example, electrically insulating washer 264 may be formed from a plastic, such as an engineering plastic, or another dielectric material. For instance, electrically insulating washer 264 may be formed from a nylon, a PEEK (polyether ether ketone), a polyamide or polyamide-imide such as Torlon® (available from Solvay S.A., Brussels, Belgium), a polyimide such as Vespel® (available from DuPont, Wilmington, Del.), or the like. In examples in which electrically insulating washer 264 is formed from a reinforced plastic, the reinforcement material may be electrically insulating, such as a glass fiber or the like.

Electrically insulating washer 264 may have a thickness selected so that electrically insulating washer 264 is electrically insulating. In some examples, the thickness of electrically insulating washer 264 may be selected so that electrically insulating washer 264 substantially prevents both galvanic conduction across electrically insulating washer 264 and capacitive coupling across electrically insulating washer 264. The wall thickness may be determined based on the material from which electrically insulating washer 264 is formed, and the parameters of the electrical signal (e.g., voltage and frequency) to which sheath may be exposed during use.

In this way, electrically insulated shaft coupling 202 may provide a coupling with high torque capability while electrically isolating the driven or driving shaft (e.g., second shaft 206) from the rotor shaft (e.g., first shaft 204) of the electric machine (e.g., motor 104 and/or generator 108 shown in FIG. 1). This may reduce or substantially eliminate risk of damage to components outside of the electric machine due to currents flowing out from the electric machine through the rotor shaft.

Figure 3:
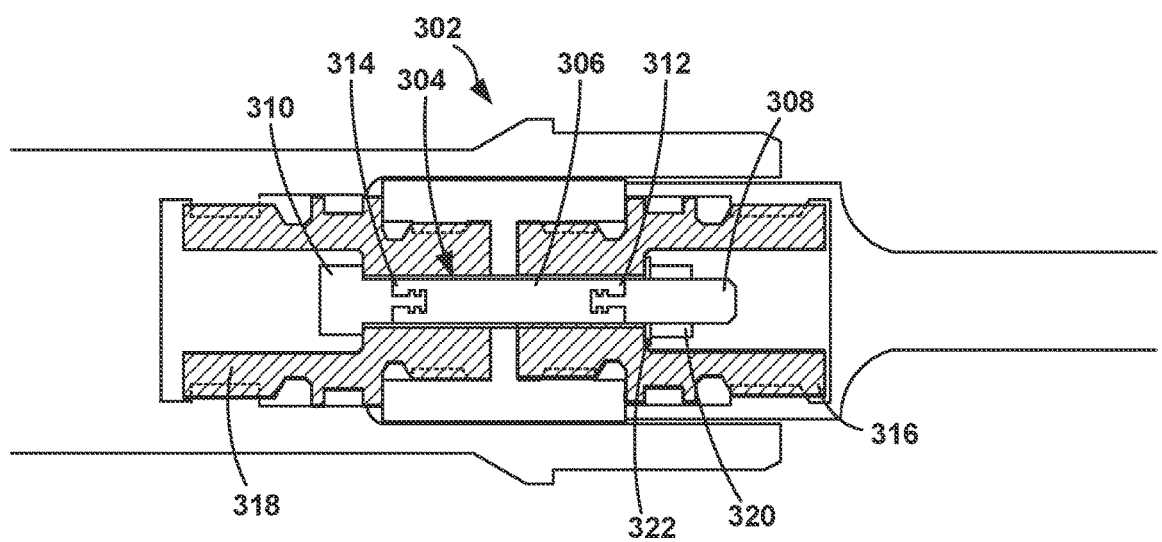
FIG. 3 is a cross-sectional diagram of another example electrically insulated shaft coupling, in accordance with one or more techniques of this disclosure.

In some examples, an electrically insulated shaft coupling may include a different type of axial connector. FIG. 3 is a cross-sectional diagram of another example electrically insulated shaft coupling 302, in accordance with one or more techniques of this disclosure. Electrically insulated shaft coupling 302 may be similar to or substantially the same as electrically insulated shaft coupling 202 of FIG. 2, aside from the differences described herein.

Like electrically insulated shaft coupling 202, electrically insulated shaft coupling 302 includes an axial connector 304. Axial connector includes a shaft 306, a first barb end 308 and a second barb end 310. First barb end 308 may be joined to a first end 312 of shaft 306, and second barb end 310 may be joined to a second end 314 of shaft 306.

Shaft 306 may be formed from an electrically insulating material. For example, shaft 306 may be formed from a plastic, such as an engineering plastic, or another dielectric material. For instance, shaft 306 may be formed from a nylon, a PEEK (polyether ether ketone), a polyamide or polyamide-imide such as Torlon® (available from Solvay S.A., Brussels, Belgium), a polyimide such as Vespel® (available from DuPont, Wilmington, Del.), or the like. In examples in which shaft 306 is formed from a reinforced plastic, the reinforcement material may be electrically insulating, such as a glass fiber or the like.

First and second barb ends 308 and 310 may be formed from any suitable metal, such as a steel (e.g., a carbon steel or a stainless steel), a titanium alloy, an aluminum alloy, or the like. Shaft 306 may be molded around the barbs of first and second barb ends 308 and 310 to secure first and second barb ends 308 and 310 to shaft 306. For example, shaft 306 may be injection molded around the barbs of first and second barb ends 308 and 310 to secure first and second barb ends 308 and 310 to shaft 306. By including shaft 306 formed from an electrically insulating polymer material, axial connector may help electrically insulate first metallic portion 316 from second metallic portion 318. In some examples, electrically insulated shaft coupling 302 may omit a sheath around shaft 306. In other examples, electrically insulated shaft coupling 302 may include a sheath, like sheath 260 of FIG. 2.

Like electrically insulated shaft coupling 202, in some examples, one or both of barb ends 308 and 310 may be threaded to allow a nut to be threaded onto the barb end. For example, in the implementation shown in FIG. 3, first barb end 308 may include threads onto which nut 320 is threaded. Nut 320 may be similar to or substantially the same as nut 262. In some examples, electrically insulated shaft coupling 302 may include a washer 322, which may be electrically insulating. In other examples, electrically insulated shaft coupling 302 may omit a washer 322.

Figure 4:
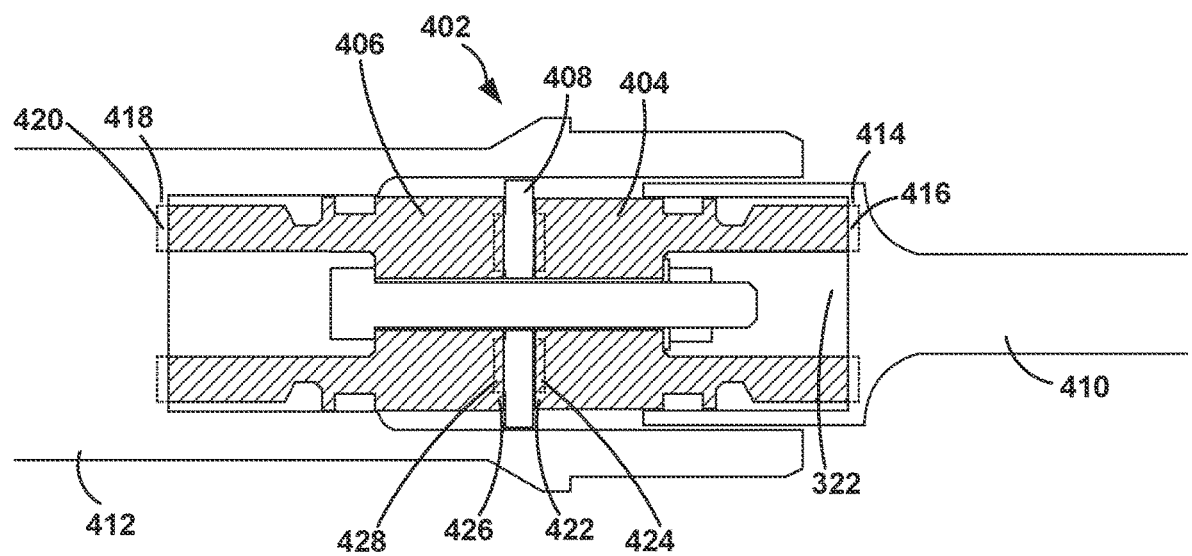
FIG. 4 is a cross-sectional diagram of another example electrically insulated shaft coupling, in accordance with one or more techniques of this disclosure.

In some implementations, as described above, one or more splined interfaces may include splines other than linear splines. FIG. 4 is a cross-sectional diagram of another example electrically insulated shaft coupling 402, in accordance with one or more techniques of this disclosure. Electrically insulated shaft coupling 402 may be similar to or substantially the same as electrically insulated shaft coupling 202 of FIG. 2, aside from the differences described herein.

Like electrically insulated shaft coupling 202 of FIG. 2, electrically insulated shaft coupling 402 includes a first metallic portion 404, a second metallic portion 406, and an electrically insulating portion 408. First metallic portion 404 interfaces with first shaft 410, and second metallic portion 406 interfaces with second shaft 412. Each of first and second metallic portion 404 and 406 also interfaces with electrically insulating portion 408.

The interfaces between the components are splined interfaces. In the example shown in FIG. 4, the splined interfaces are curvic splines. For example, first shaft 410 includes a plurality of first shaft splines 414 and first metallic portion 404 includes a first plurality of first metallic portion splines 416. The plurality of first shaft splines 414 interface with the first plurality of first metallic portion splines 416 to couple first shaft 410 to electrically insulating shaft coupling 402.

Second shaft 412 includes a plurality of second shaft splines 418 and second metallic portion 406 includes a first plurality of second metallic portion splines 410. The plurality of second shaft splines 418 interface with the first plurality of second metallic portion splines 420 to couple second shaft 412 to electrically insulating shaft coupling 402.

First metallic portion 404 also includes a second plurality of first metallic portion splines 422, which interface with a first plurality of electrically insulating portion splines 424 formed in electrically insulating portion 408. The second plurality of first metallic portion splines 422 and the first plurality of electrically insulating portion splines 424 couple first metallic portion 404 and electrically insulating portion 408.

Second metallic portion 406 also includes a second plurality of second metallic portion splines 426, which interface with a second plurality of electrically insulating portion splines 428 formed in electrically insulating portion 408. The second plurality of second metallic portion splines 426 and the second plurality of electrically insulating portion splines 428 couple second metallic portion 406 and electrically insulating portion 408.

In other examples, the splined interfaces may include other types of splines, such as helical splines.

Electrically insulating shaft coupling 402 also includes an axial connector (not labelled in FIG. 4), which may be similar to or the same as axial connector 252 of FIG. 2 or axial connector 304 of FIG. 3. In some examples in which helical splines are used to couple first metallic portion 404 to electrically insulating portion 408 and/or to couple second metallic portion 406 to electrically insulating portion 408, axial connector 252 may be omitted. In some examples, a spring may be used to apply an axially compressive force to first metallic portion 404 or second metallic portion 406, or a magnet may be used to generate an attractive axial force to one or both of first metallic portion 404 or second metallic portion 406.

The following examples may illustrate one or more aspects of the disclosure:

Example 1: An electrically insulated shaft coupling comprising: a first metallic portion, wherein the first metallic portion comprises a first plurality of splines configured to interface with splines of a first rotating shaft; a second metallic portion, the second metallic portion comprises a second plurality of splines configured to interface with splines of a second rotating shaft; and an electrically insulating portion that separates the first metallic portion and the second metallic portion.

Example 2: The electrically insulated shaft coupling of example 1, further comprising: an axial connector configured to axially retain the first and second metallic portions relative to each other.

Example 3: The electrically insulated shaft coupling of example 2, wherein: the first metallic portion, the second metallic portion, and the electrically insulating portion define a bore, and the axial connector extends through the bore to axially retain the first metallic portion, the second metallic portion, and the electrically insulating portion relative to each other.

Example 4: The electrically insulated shaft coupling of example 2 or 3, wherein the axial connector comprises a metallic shaft and an electrically insulating sheath surrounding a circumferential surface of the metallic shaft.

Example 5: The electrically insulated shaft coupling of example 2 or 3, wherein the axial connector comprises a first end comprising a first metallic barb, a second end comprising a second metallic barb, and an electrically insulating shaft joining the first metallic barb and the second metallic barb.

Example 6: The electrically insulated shaft coupling of example 2 or 3, wherein the axial connector comprises an injection molded shaft extending through the first bore, the second bore, and the third bore.

Example 7: The electrically insulated shaft coupling of example 2 or 3, wherein the axial connector comprises a magnetic coupling.

Example 8: The electrically insulated shaft coupling of any one of examples 1 to 7, wherein: the first plurality of splines are on a radially outward surface of the first metallic portion, and the second plurality of splines are on a radially outward surface of the second metallic portion.

Example 9: The electrically insulated shaft coupling of any one of examples 1 to 8, wherein the first metallic portion further comprises a third plurality of splines on the radially outward surface of the first metallic portion, the second metallic portion further comprises a fourth plurality of splines on the radially outward surface of the second metallic portion, the electrically insulating portion comprises a fifth plurality of splines on a radially inward surface of the electrically insulating portion and a sixth plurality of splines on the radially inward surface of the electrically insulating portion, the third plurality of splines are configured to interface with the fifth plurality of splines and the fourth plurality of splines are configured to interface with the sixth plurality of splines.

Example 10: A system comprising: an electric machine comprising: a stator; a rotor; and a rotor shaft coupled to the rotor; an external shaft; and an electrically insulated shaft coupling comprising: a first metallic portion, wherein the first metallic portion comprises a first plurality of splines configured to interface with splines of a first rotating shaft; a second metallic portion, the second metallic portion comprises a second plurality of splines configured to interface with splines of a second rotating shaft; and an electrically insulating portion that separates the first metallic portion and the second metallic portion.

Example 11: The system of example 10, wherein the electrically insulated shaft further comprises: an axial connector configured to axially retain the first and second metallic portions relative to each other.

Example 12: The system of example 11, wherein: the first metallic portion defines a first bore, the second metallic portion defines a second bore, the electrically insulating portion defines a third bore, and the axial connector extends through the first bore, the second bore, and the third bore to axially retain the first metallic portion, the second metallic portion, and the electrically insulating portion relative to each other.

Example 13. The system of example 11 or 12, wherein the axial connector comprises a metallic shaft and an electrically insulating sheath surrounding a circumferential surface of the metallic shaft.

Example 14: The system of example 11 or 12, wherein the axial connector comprises a first end comprising a first metallic barb, a second end comprising a second metallic barb, and an electrically insulating shaft joining the first metallic barb and the second metallic barb.

Example 15: The system of example 11 or 12, wherein the axial connector comprises an injection molded shaft extending through the first bore, the second bore, and the third bore.

Example 16: The system of example 11 or 12, wherein the axial connector comprises a magnetic coupling.

Example 17: The system of any one of examples 10 to 16, wherein: the first plurality of splines are on a radially outward surface of the first metallic portion, and the second plurality of splines are on a radially outward surface of the second metallic portion.

Example 18: The system of any one of examples 10 to 17, wherein the first metallic portion further comprises a third plurality of splines on the radially outward surface of the first metallic portion, the second metallic portion further comprises a fourth plurality of splines on the radially outward surface of the second metallic portion, the electrically insulating portion comprises a fifth plurality of splines on a radially inward surface of the electrically insulating portion and a sixth plurality of splines on the radially inward surface of the electrically insulating portion, the third plurality of splines are configured to interface with the fifth plurality of splines and the fourth plurality of splines are configured to interface with the sixth plurality of splines.

Example 19: The system of any one of examples 10 to 18, further comprising an electrically conductive bearing supporting at least one of rotor shaft or the external shaft.

Various examples have been described. These and other examples are within the scope of the following claims.

What is claimed is:

1. An electrically insulated shaft coupling comprising:
   a first metallic portion, wherein the first metallic portion comprises a first plurality of splines configured to position within a first cavity of a first rotating shaft and interface with splines of the first rotating shaft;
   a second metallic portion, wherein the second metallic portion comprises a second plurality of splines configured to position within a second cavity of a second rotating shaft and interface with splines of the second rotating shaft;
   an electrically insulating portion that separates the first metallic portion and the second metallic portion; and
   an axial connector extending from a first end positioned in the first cavity to a second end positioned in the second cavity, wherein the axial connector is configured to axially retain the first and second metallic portions relative to each other.

2. The electrically insulated shaft coupling of claim 1, wherein:
   the first metallic portion, the second metallic portion, and the electrically insulating portion define a bore, and
   the axial connector extends through the bore to axially retain the first metallic portion, the second metallic portion, and the electrically insulating portion relative to each other.

3. The electrically insulated shaft coupling of claim 1, wherein the axial connector comprises a metallic shaft and an electrically insulating sheath surrounding a circumferential surface of the metallic shaft.

4. The electrically insulated shaft coupling of claim 1, wherein the axial connector comprises a first end comprising a first metallic barb, a second end comprising a second metallic barb, and an electrically insulating shaft joining the first metallic barb and the second metallic barb.

5. The electrically insulated shaft coupling of claim 1, wherein the axial connector comprises an injection molded shaft extending through the first bore, the second bore, and the third bore.

6. The electrically insulated shaft coupling of claim 1, wherein the axial connector comprises a magnetic coupling.

7. The electrically insulated shaft coupling of claim 1, wherein:
   the first plurality of splines are on a radially outward surface of the first metallic portion, and
   the second plurality of splines are on a radially outward surface of the second metallic portion.

8. The electrically insulated shaft coupling of claim 7, wherein:
   the first metallic portion further comprises a third plurality of splines on the radially outward surface of the first metallic portion,
   the second metallic portion further comprises a fourth plurality of splines on the radially outward surface of the second metallic portion,
   the electrically insulating portion comprises a fifth plurality of splines on a radially inward surface of the electrically insulating portion and a sixth plurality of splines on the radially inward surface of the electrically insulating portion, and
   the third plurality of splines are configured to interface with the fifth plurality of splines and the fourth plurality of splines are configured to interface with the sixth plurality of splines.

9. An electromechanical system comprising:
an electric machine comprising:
- a stator;
- a rotor configured to rotate relative to the stator; and
- a rotor shaft coupled to the rotor;

an external shaft; and
an electrically insulated shaft coupling comprising:
- a first metallic portion, wherein the first metallic portion comprises a first plurality of splines configured to position within a first cavity of a first rotating shaft and interface with splines of the first rotating shaft;
- a second metallic portion, wherein the second metallic portion comprises a second plurality of splines configured to position within a second cavity of a second rotating shaft and interface with splines of the second rotating shaft;
- an electrically insulating portion that separates the first metallic portion and the second metallic portion; and
- an axial connector extending from a first end positioned in the first cavity to a second end positioned in the second cavity, wherein the axial connector is configured to axially retain the first and second metallic portions relative to each other.

10. The electromechanical system of claim 9, wherein:
the first metallic portion defines a first bore,
the second metallic portion defines a second bore,
the electrically insulating portion defines a third bore, and
the axial connector extends through the first bore, the second bore, and the third bore to axially retain the first metallic portion, the second metallic portion, and the electrically insulating portion relative to each other.

11. The electromechanical system of claim 9, wherein the axial connector comprises a metallic shaft and an electrically insulating sheath surrounding a circumferential surface of the metallic shaft.

12. The electromechanical system of claim 9, wherein the axial connector comprises a first end comprising a first metallic barb, a second end comprising a second metallic barb, and an electrically insulating shaft joining the first metallic barb and the second metallic barb.

13. The electromechanical system of claim 9, wherein the axial connector comprises an injection molded shaft extending through the first bore, the second bore, and the third bore.

14. The electromechanical system of claim 9, wherein the axial connector comprises a magnetic coupling.

15. The electromechanical system of claim 9, wherein:
the first plurality of splines are on a radially outward surface of the first metallic portion, and
the second plurality of splines are on a radially outward surface of the second metallic portion.

16. The electromechanical system of claim 15, wherein:
the first metallic portion further comprises a third plurality of splines on the radially outward surface of the first metallic portion,
the second metallic portion further comprises a fourth plurality of splines on the radially outward surface of the second metallic portion,
the electrically insulating portion comprises a fifth plurality of splines on a radially inward surface of the electrically insulating portion and a sixth plurality of splines on the radially inward surface of the electrically insulating portion, and
the third plurality of splines are configured to interface with the fifth plurality of splines and the fourth plurality of splines are configured to interface with the sixth plurality of splines.

17. The electromechanical system of claim 9, further comprising an electrically conductive bearing supporting at least one of rotor shaft or the external shaft.

* * * * *